US011436520B2

(12) United States Patent
Beveridge et al.

(10) Patent No.: US 11,436,520 B2
(45) Date of Patent: Sep. 6, 2022

(54) REDACTION OF ARTIFICIAL INTELLIGENCE TRAINING DOCUMENTS

(71) Applicant: Cylance Inc., Irvine, CA (US)

(72) Inventors: David Neill Beveridge, Portland, OR (US); Yaroslav Oliinyk, Portland, OR (US); David Michael Liebson, Portland, OR (US)

(73) Assignee: Cylance Inc., San Ramon, CA (US)

( * ) Notice: Subject to any disclaimer, the term of this patent is extended or adjusted under 35 U.S.C. 154(b) by 1132 days.

(21) Appl. No.: 15/452,623

(22) Filed: Mar. 7, 2017

(65) Prior Publication Data
US 2018/0260734 A1    Sep. 13, 2018

(51) Int. Cl.
*G06N 20/00*    (2019.01)
*G06F 21/62*    (2013.01)

(52) U.S. Cl.
CPC ......... *G06N 20/00* (2019.01); *G06F 21/6245* (2013.01)

(58) Field of Classification Search
CPC ...... G06F 40/14; G06F 21/6245; G06N 20/00
See application file for complete search history.

(56) References Cited

U.S. PATENT DOCUMENTS

| | | | |
|---|---|---|---|
| 9,489,354 B1* | 11/2016 | Lee | G06F 40/166 |
| 9,519,696 B1* | 12/2016 | Roth | G06F 16/258 |
| 2006/0143459 A1* | 6/2006 | Villaron | G06F 21/6254 |
| | | | 713/176 |
| 2009/0135444 A1* | 5/2009 | Best | G06F 21/6245 |
| | | | 358/1.15 |
| 2009/0144619 A1* | 6/2009 | Best | G06F 21/6245 |
| | | | 715/277 |
| 2009/0164878 A1* | 6/2009 | Cottrille | G06F 21/6245 |
| | | | 715/210 |
| 2011/0239113 A1* | 9/2011 | Hung | G16H 10/60 |
| | | | 715/271 |
| 2012/0159296 A1* | 6/2012 | Rebstock | G06F 40/166 |
| | | | 715/205 |
| 2014/0278909 A1* | 9/2014 | Potter | G06Q 30/0242 |
| | | | 705/14.41 |
| 2015/0007351 A1* | 1/2015 | Janajri | H04L 51/00 |
| | | | 726/30 |
| 2015/0071542 A1* | 3/2015 | Dahl | G06K 9/00852 |
| | | | 382/177 |
| 2016/0239668 A1* | 8/2016 | Bellert | G06F 21/602 |
| 2016/0294750 A1* | 10/2016 | Ansari | G06F 3/04845 |
| 2016/0316097 A1* | 10/2016 | Lineweber | H04N 1/4453 |
| 2016/0328562 A1* | 11/2016 | Saxena | G06F 21/56 |
| 2018/0181752 A1* | 6/2018 | Guri | G06F 21/56 |
| 2020/0067861 A1* | 2/2020 | Leddy | H04L 51/12 |

* cited by examiner

*Primary Examiner* — Kyle R Stork
(74) *Attorney, Agent, or Firm* — Jones Day

(57) ABSTRACT

Systems and methods are provided herein for redaction of artificial intelligence (AI) training documents. Data comprising an unredacted document is received. The unredacted document comprises a plurality of objects arranged according to a first topology. The unredacted document is parsed to identify objects either directly or relationally containing user sensitive information using a predetermined rule set based on the first topology. The user sensitive information within the unredacted document is substituted with placeholder information to generate a redacted document having a second topology. The second topology is substantially identical to the first topology. In some variations, the redacted document is provided to an AI model for training.

21 Claims, 11 Drawing Sheets

The Cylance Difference

So what makes Cylance machine learning stand out from the rest?

Cylance works because it:

- Achieves efficacy rates at or higher than 99% (compared to 50-60% with legacy AV)
- Requires minimal system resources, 1-2% CPU usage and 40-50 MB of memory
- Prevents attacks with exceptional speed — in milliseconds
- Requires no cloud connection to prevent threats Unlike human analysis or competitive offerings, Cylance machine learning operates with unparalleled precision, preventing 99% of existing and never-before-seen malware.

How? Cylance AI analyzes statistically similar blocks of file code to identify malicious files. It does this through observation, pattern recognition, and predictive analytics. This approach supplies a quantum leap in endpoint protection over traditional malware signatures, heuristic, or behavioral methods by taking advantage of sophisticated math models to identify malware. Instead of reactive signatures, threats are blocked automatically in real time.

Other vendors claim to use machine learning, but their solutions require a patient zero or a user "sacrificial lamb" that must get breached by malware or a malicious payload. The first Cylance machine learning model was published more than two years ago. It was so effective that when Machine learning requires a massive amount of data to process, and it needs equally massive compute processing. Cylance leverages hundreds of high-performance computing clusters that live in the cloud to build its artificial intelligence model. The result is fast, efficient pre-execution protection that works in milliseconds.

FIG. 6

REDACTION OF ARTIFICIAL INTELLIGENCE TRAINING DOCUMENTS

TECHNICAL FIELD

The subject matter described herein relates to the selective redaction of documents to enable them to remain suitable for training artificial intelligence models while, at the same time, removing sensitive information.

BACKGROUND

Computing environments are becoming increasingly complex as networks exchange data amongst large numbers of nodes (e.g., clients, mobile computing devices, servers, etc.) via various gateways (e.g., routers, etc.) and using various communications protocols. Such complexity makes such networks susceptible to security breaches and other types of unauthorized access to such communications. Cyber security software can provide protection against such security breaches and unauthorized access attempts.

SUMMARY

In one aspect, data comprising an unredacted document is received. The unredacted document comprises a plurality of objects arranged according to a first topology. The unredacted document is parsed to identify objects either directly or relationally containing user sensitive information using a predetermined rule set based on the first topology. The user sensitive information within the unredacted document is substituted with placeholder information to generate a redacted document having a second topology. The second topology is substantially identical to the first topology. A file size of the redacted document is substantially similar to a file size of the unredacted document.

In some variations, data comprising each of a plurality of redacted documents is received. Each redacted document comprising a plurality of objects arranged in a topology. At least one object in one of the plurality of redacted documents includes malicious information. Using at least a portion of the plurality of redacted documents, an artificial intelligence (AI) model is trained based on the malicious information. The AI model renders the malicious information into a plurality of data points. The AI model is enabled to characterize subsequently received documents as likely to contain malicious information.

Display of at least a portion of the redacted document in a graphical user interface of the computing device can be initiated. At least a portion of the redacted document can be provided. For example, the portion of the redacted document can be provided by displaying at least a portion of the redacted document, loading at least a portion of the redacted document into memory, storing at least a portion of the redacted document, or transmitting at least a portion of the redacted document to a remote computing system.

The placeholder information can be randomly generated data or randomly generated data which is encrypted, encoded, or compressed. The placeholder information can also be user input information received from a user via user data entry within a graphical user interface.

In some variations, the user sensitive information can comprise a uniform resource identifier (URI) and the placeholder information comprises a remote server URI. An identification tag for the redacted document can be generated, wherein the placeholder information includes the identification tag. At least one of an Internet Protocol (IP) address, a timestamp, and a user account associated with an attempt to access the remote server URI originating from an unauthorized computing device can be identified. A notification of the attempt to the authorized computing device can be provided.

The placeholder information for an image can be a placeholder image mirroring the dimensions of the image.

In another aspect, data comprising each of a plurality of redacted documents is received. Each redacted document comprises a plurality of objects arranged in a topology. Each document is scored, using at least one AI model, based on a statistical model. Using at least one AI model trained using a plurality of redacted documents, it is determined whether each document comprises malicious information based on the score and a degree of confidence associated with the score. Data identifying those documents determined to comprise malicious information is provided.

In some aspects, systems can be provided for implementing various operations described herein that include at least one data processor and memory.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides the ability to remove user sensitive information from an unredacted document while ensuring the document is modified as little as possible to maintain its topology and other non-sensitive information. Moreover, substantially preserving a topology of the unredacted document through the current subject matter allows for an AI/machine learning model to be trained on a substantially similar redacted document absent user sensitive information.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3A is an example unredacted document containing text;

FIG. 3B is an example redacted document of the unredacted document in FIG. 3A;

FIG. 6 is an example unredacted document containing both text and an image;

Like reference symbols in the various drawings indicate like elements.

DETAILED DESCRIPTION

The current subject matter is directed to techniques for redacting (i.e., obscuring, etc.) sensitive information from documents while, at the same time, allowing such document to remain useful for the training of AI/machine learning models. As provided herein, documents used to train AI models can include user sensitive information that may not be required for the training of such model. This user sensitive information can be redacted from the document in an effort to substantially maintain a topology, file size, and non-sensitive information of a document for AI training.

While the following is described in connection with the use of documents for training AI/machine learning models for cyber security application such as endpoint malware detection, the current subject matter is applicable to other applications such as medical record analysis in which AI models can be trained using documents that potentially include user sensitive information. More generally, the current subject matter can be used in connection with manual/non-AI document analysis that is unrelated to content within the document. For example, a shared document for manual malware analysis may be prevented from leaving a designated facility due to classified content within the document. The presence of classified content can also limit the number of individuals who can access the document in order to perform the malware analysis. Use of the current subject matter can allow for the removal of the classified content so that the document can be removed from the designated facility and/or so that the document is accessible to a larger number of individuals who can perform the malware analysis. In another example, the current subject matter can also be used in connection with e-discovery document production to protect user sensitive information within requested and/or produced documents.

Figure 1:
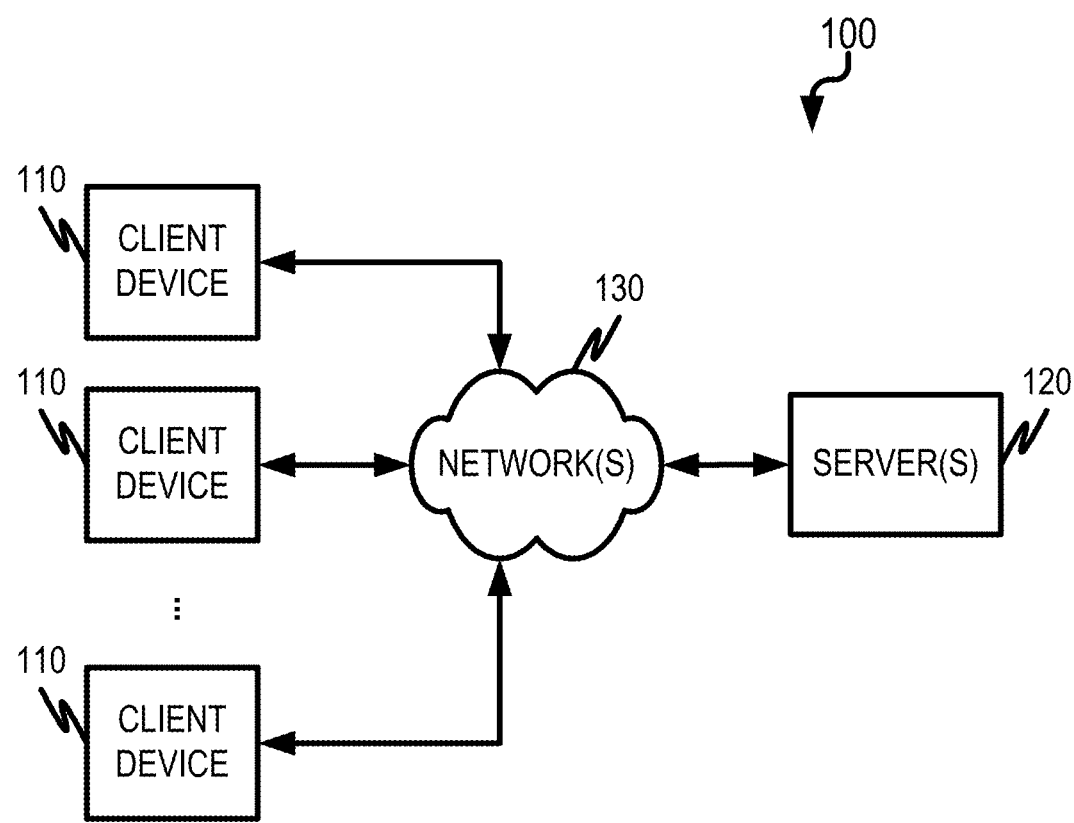
FIG. 1 is a system diagram illustrating an example system architecture for use in connection with the current subject matter.

FIG. 1 is a system diagram illustrating an example system architecture 100 for use in connection with the current subject matter. The current subject matter is described in connection with an arrangement involving one or more client devices 110 and one or more servers 120 which can communicate over one or more networks 130. Each of the one or more client devices 110 and the one or more servers 120 comprise one or more programmable data processors and memory for storing instructions for executed by such data processor(s). Furthermore, it will be appreciated that each of the client devices 110 or servers 120 can comprise more than one computing device depending on the desired configuration and that the illustrations in FIG. 1 is simplified to aid in the understanding of the current subject matter.

Figure 2:
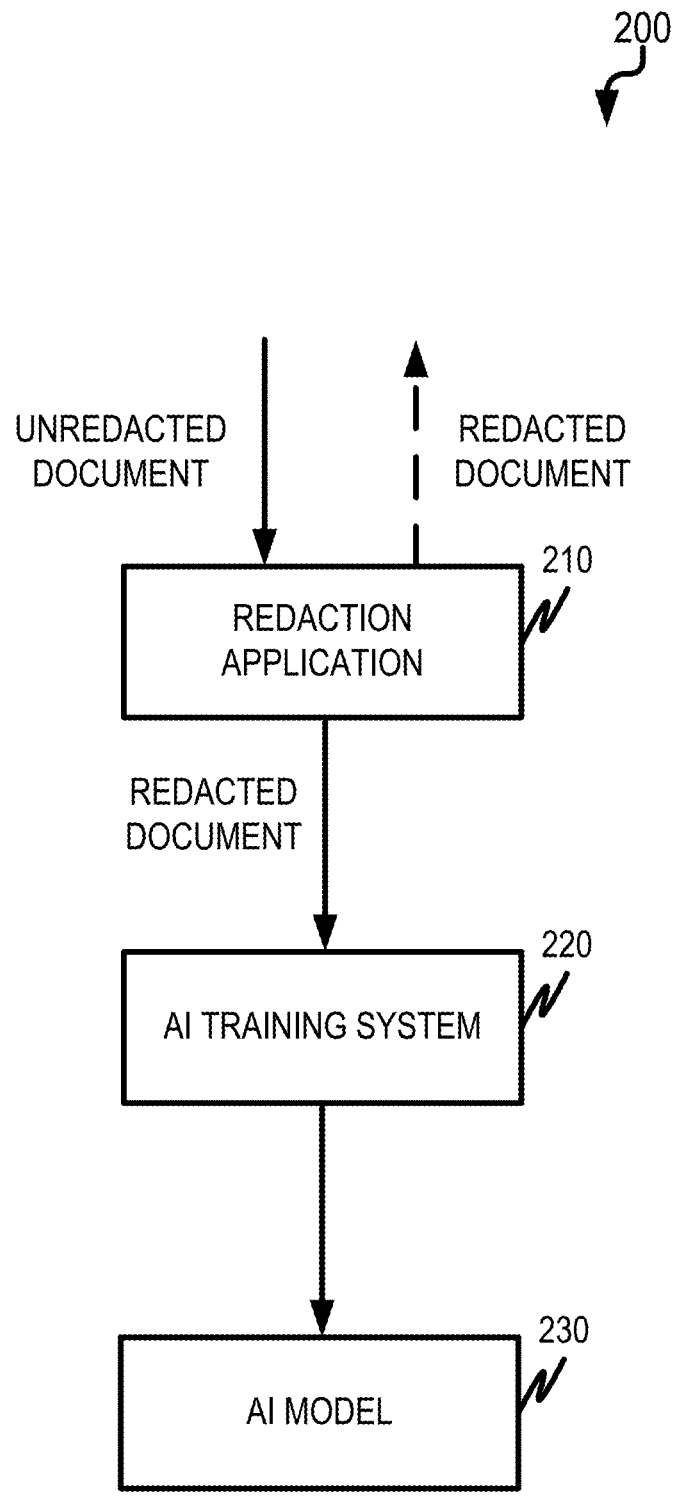
FIG. 2 is an example system diagram illustrating an example system architecture of an interaction between a redaction application and an AI model.

FIG. 2 is an example system diagram 200 of an example system architecture of an interaction between a redaction application 210, an AI training system 220, and an AI model 230. Both AI training system 220 and AI model 230 are part of an AI system. A redaction application 210 can reside or otherwise be executed on one or more client devices 110 and/or one or more servers 120. Redaction application 210 can receive an unredacted document via the client device 110 or server 120. An unredacted document can have an associated topology, file size, and contain both user sensitive information and non-sensitive information. An unredacted document can be, for example, a Portable Document Format (PDF), an Office Open Extendable Markup Language (OOXML), or an Object-Linking and Embedding (OLE) document, or a Microsoft Compound File Binary Format (CFB). An unredacted document can be comprised of a plurality of objects such as text, images, metadata, and/or graphic operations. Each of these objects can either contain sensitive information or reference another object which contains sensitive information. In both cases, these objects can be replaced with placeholder information.

The unredacted document can contain user sensitive information which may not be required for training the AI model 230. Using the subject matter described herein, a redacted document having placeholder information substituted for the user sensitive information can be provided to an AI training system 220. A redacted document can have substantially the same topology, file size, and non-sensitive information as the unredacted document. Content can be resident in compressed streams which, upon re-compressing with altered data, can result in a slightly different size. In this case, the redacted document can contain padding (i.e., additional '0' bytes) to ensure that redacted object within the redacted document is substantially the same size in bytes as the original object of the unredacted document. The AI training system 220 can be, for example, an automated system. Maintaining the topology of the redacted document can make the document transparent to the AI training system 220. In other words, the AI training system 220 can be trained in the same manner regardless if the document fed in is either a redacted document or an unredacted document.

The AI training system 220, for example, can provide training for the AI model 230. When AI training system 220 receives a document, the document is rendered into a large number of features (i.e., measured data points of aspects of an object). AI model 230 can score documents which classifies a document with a statistical model in order to determine a score. The score can indicate a classification of the received document (i.e., malicious or not malicious) and a degree of confidence of that classification. In some variations, this score can also be used for statistical analysis to determine, for example, what features of the redacted document are used and/or the overall complexity of the redacted document. As the topology of the redacted document is substantially the same as the unredacted document, the scoring of the redacted document should be substantially similar to that of the unredacted document.

The redacted document can also be provided by, for example, displaying at least a portion of the redacted document on a display of one or more client devices 110. Through display of the redacted document, a user can confirm, via selecting of one more graphical user interface elements rendered within a graphical user interface, that necessary user sensitive information has been redacted prior to providing the redacted document to a remote client device, for example. The redacted document can also be loaded into memory, stored in physical persistence, and/or transmitted to a remote computing system.

Figures 3A, 3B:
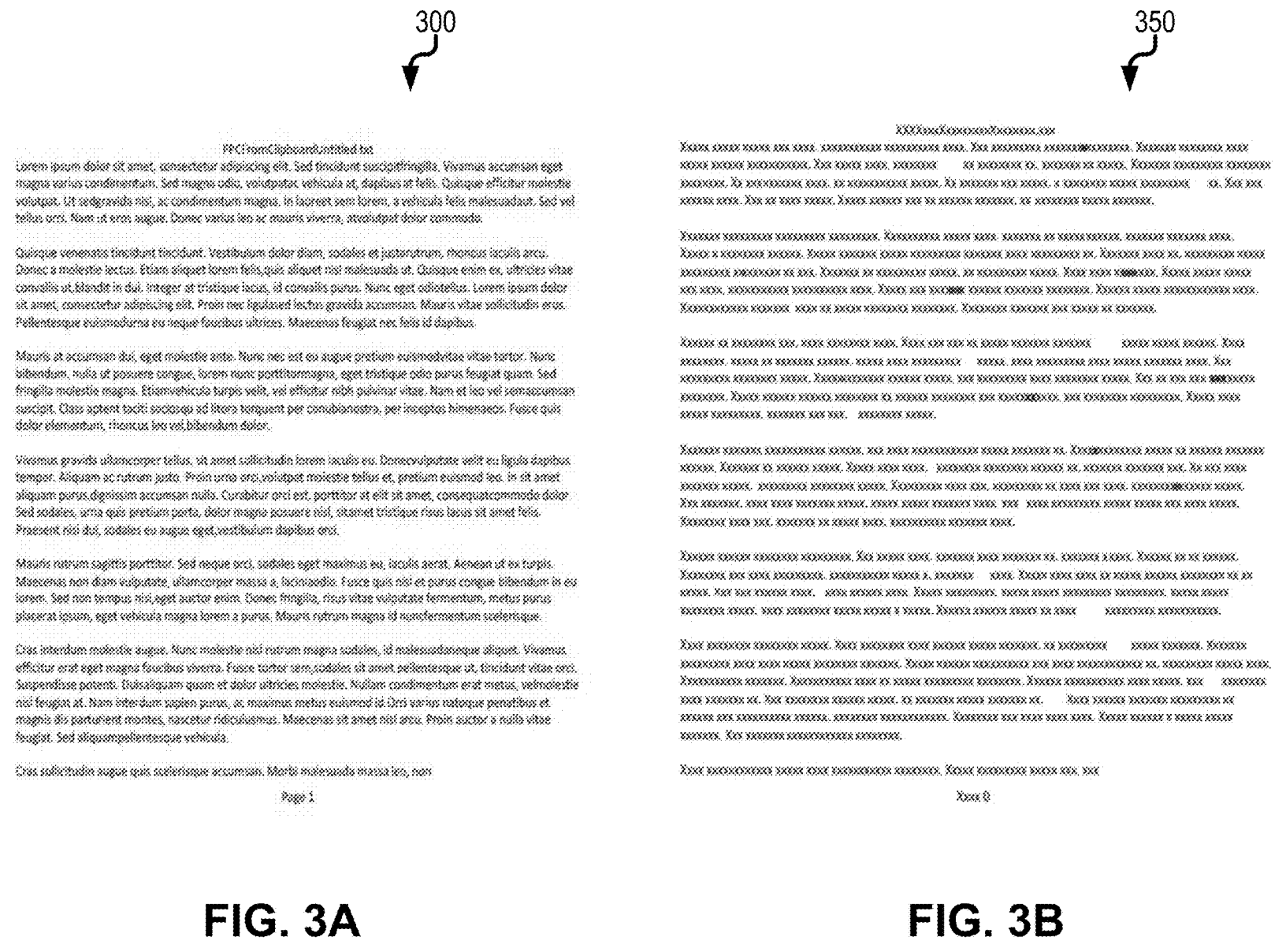

FIG. 3A is an example unredacted document 300 containing text. The unredacted document 300 is parsed to identify objects either directly or relationally containing user sensitive information. After parsing/lexing the text-layout instruction-stream of the unredacted document 300, placeholder information can be substituted for the user sensitive information using a byte-for-byte character swap. Characters can be swapped, for example, according to various predetermined rules based on a topology of the unredacted document 300. For example, a stream of text can be of the form of mixed layout instructions and the actual data of the text. A predetermined rule set for such a stream can find the specific instructions which have data that is used for text, and then overwrite that data. Character swapping, for example, is not reversible.

Some information about text can be preserved for ease of redaction verification. Such information can include, for example: swapped character case (i.e., replacing lowercase characters with a lowercase 'x' and replacing uppercase with an uppercase 'X'), newline characters preservation, whitespace character preservation, or numbers replacement with zeros. When redacting data stored in sectors (i.e., content defined by a Sector Allocation Table), the altered size and/or location of the sectors can be maintained.

The predetermine rule sets can differ based on a document type (i.e., different between PDF, OLE and OOXML documents). For a PDF and OOXML document, a rule can require swapping a lowercase to 'x', swap uppercase to 'X', swapping numbers to '0', preventing newline or whitespace alteration, swapping unprintable or 'remapped' (i.e., when a character's binary representation is altered via use of custom fonts or partially-embedded fonts) to '_' (or to the remapped '_' character). For OLE documents, the stream can be removed with document content including text, layout, and markup with '0' bytes.

FIG. 3B is an example redacted document 350 of unredacted document 300. The redacted document 350, contains placeholder information (i.e., "X" characters). Placeholder information can also include, for example, randomly generated data or user input information such as text of a well-known novel or common phrase.

In some variants, the placeholder information can be generated data using data external to the unredacted document 300 which is either encrypted, encoded, or compressed. In this example, the generated data can be generated so as to mislead an attacker. The content of the redacted document 350 can appear to be obfuscated, leading attackers into trying to find ways to code break the placeholder information when, in fact, the user sensitive information has been redacted from the unredacted document. For example, a deterministic random key can be used to XOR a random set of data that has a known structure or an uneven statistical distribution (i.e., "scratchpad"). When the code is broken, it results in a still-obfuscated/encoded looking string.

Metadata, Extensible Markup Language (XML), and URIs can be substituted using the same placeholder information as text. In some variations, a URI can be replaced with an identification tag of a remote server (i.e., one or more servers 120). An identification tag can be generated for the unredacted document 300. The placeholder information can include the identification tag along with a URI of the remote server. A URI-using object (i.e., an object which contains or refers to another object which contains a URI), for example, can be content that resides or refers to a resource that resides on a remote server and/or can be re-written to include information which the remote server can use to identify the source document which requested it. This is possible, for example, for images, stylesheets, cross-site scripts, email addresses, and other content that cause a DNS lookup. The remote server can identify an access attempt made on the remote server URI through either an Internet Protocol (IP), a DNS Lookup, or a user account associated with an unauthorized computing device attempting to access the redacted document 350. For example, a DNS "E63nUS.cylance.com" could point to "www.cylance.com" where the "E63nUS" is a service portion of the URI which is actually a unique identification tag for the redacted document. A notification of the attempt can be provided to the original user of the redacted document indicating an access by the unauthorized device, and possibly analysis of, the redacted document 350.

Figures 4A, 4B:
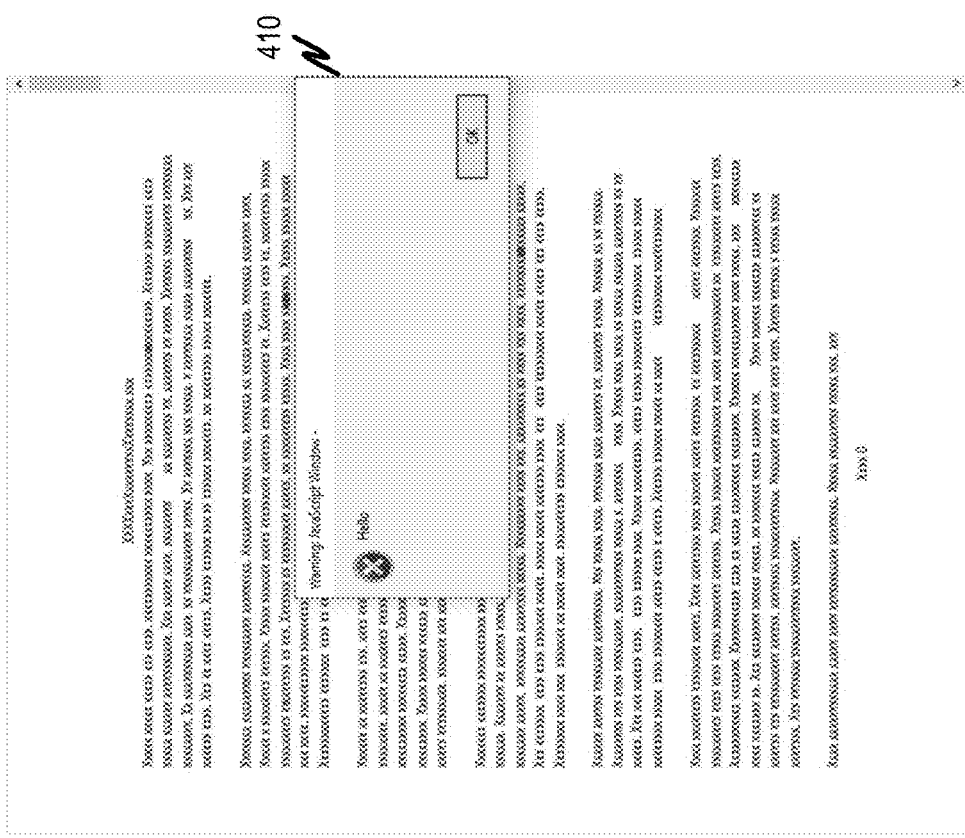
FIG. 4A is an example unredacted document containing text with an embedded script.
FIG. 4B is an example redacted document of the unredacted document in 4A.

FIG. 4A is an example unredacted document 400 containing both text and an embedded script. Some components of unredacted documents can be retained within the redacted document. For example, components containing non-sensitive information such as hidden objects, appended data, injected payloads, or exploits having non-user sensitive information. Non-sensitive objects can include, for example, fonts, non-sensitive metadata such as software that created the document, enabled document features, document version, scripts, rich objects such as u3d graphics, embedded files, anomalous data that cannot be normally used by document readers/writers, timestamps, non-referenced unrendered data, and/or forms. In some cases, unredacted document 400 can contain non-sensitive information such as a script which provides a pop-up window 410. This non-sensitive information can be retained in redacted document 450 as shown in FIG. 4B. FIG. 4B is an example redacted document 450 of unredacted document 400 of FIG. 4A with such non-sensitive information retained.

In some cases, the non-sensitive objects previously described can also be malicious. Malicious information can include, for example, scripts (i.e., JavaScripts), malware, exploits in embedded technology (i.e., malformed U3D instructions in a 3D rendering PDF), embedded malicious Shockwave/Flash files, and bombs (i.e., compressed data that decompresses to an unreasonably large size to the point where it can cause failure in the processing system). Malicious information can also include appended (or prepended) payloads and unreferenced payloads (i.e., a legitimate object within a document that is not actually part of that document's structure, which can be run-time accessed by benign-looking or malicious code).

Figure 5B:
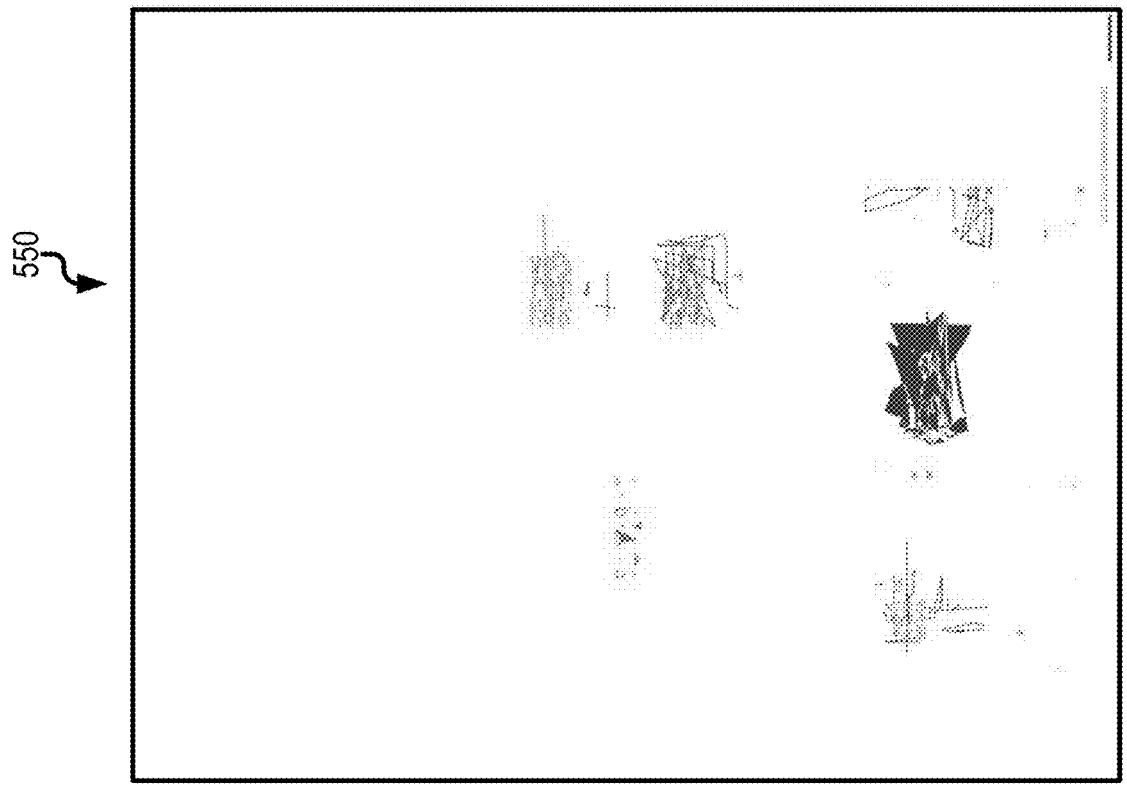
FIG. 5B is an example redacted document of the unredacted document in FIG. 5A.
Figure 5A:
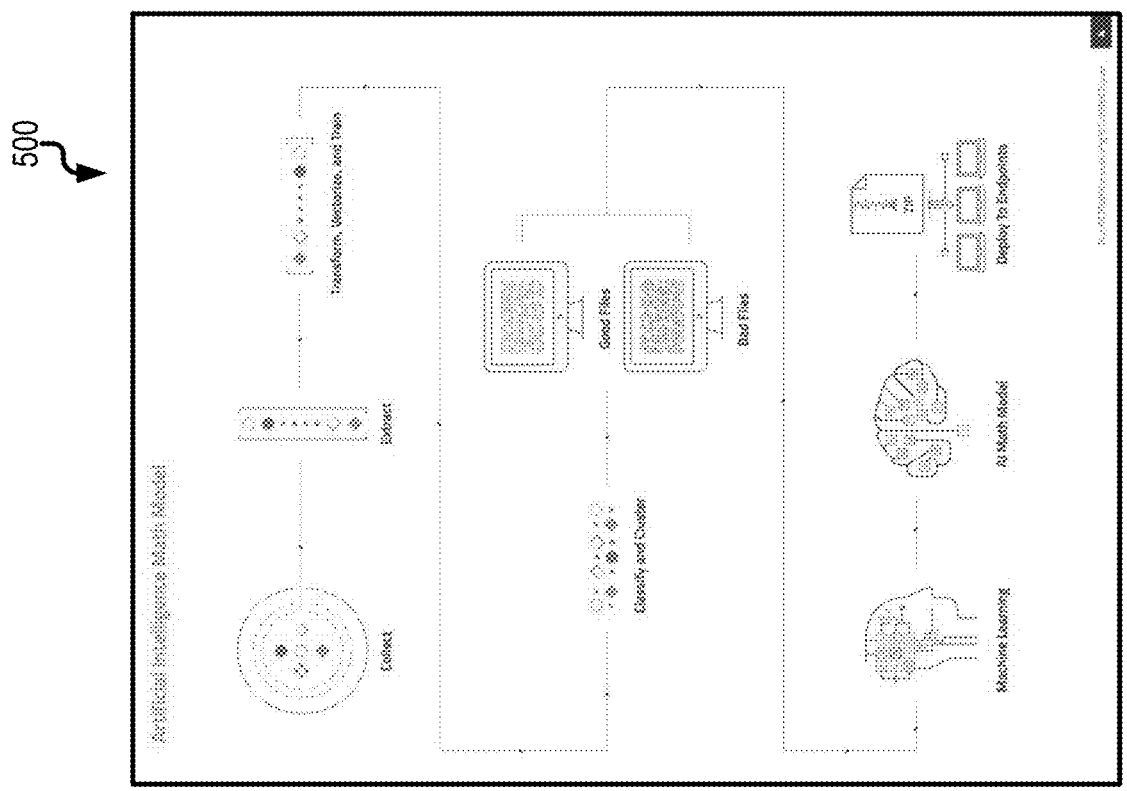
FIG. 5A is an example unredacted document containing both text and graphics operators.

FIG. 5A is an example unredacted document 500 containing graphics operators. Graphic operators are a sequence of instructions in reverse polish notation which can be rendered as graphics upon the page. The content portions of the graphics operator instructions (i.e., 'c', 'v', 'l', 'y', and 're' instructions) are redacted. Parameters on the instruction stack can be substituted with new, plausible values. For example, the instructions that result in directly rendering data by repositioning the start, finish, and curve values can be redacted. For 'l' instructions, a straight line can be drawn from a current position to (x, y). For 'c' instructions, a Bézier curve can be drawn from a current position through (x1, y1), (x2, y2), (x3, y3), using (x1, y1) and (x2, y2) as control points. For 'v' instructions, a Bézier curve can be drawn from a current position through (x2, y2), (x3, y3), using a current point and (x2, y2) as a control point. For 'y' instructions, a Bézier curve can be drawn from a current point to (x3, y3) using both parameters as control points. For 're' instructions, a rectangle can be drawn with a lower left corner at (x1, y1) and having width and height properties.

FIG. 5B is an example redacted document 550 of unredacted document 500. Some components within unredacted document 500 are maintained. For example, maintained instructions unrelated to rendering of the graphic operations can include move instructions (i.e., 'm'), halt instructions (i.e., 'h'), stroke instructions (i.e., 'S', 's'), fill instructions (i.e., 'f', 'F', 'f*', 'B', 'B*', 'b'), and end instructions (i.e., 'n'). In some variations, this can be achieved by unlinking graphic operators from the document instructions that refer to it by making it invisible or unreachable to a rendered and yet leaving its information behind. In other variations, these techniques can be applied to formatted sequence of instructions.

Figure 7:
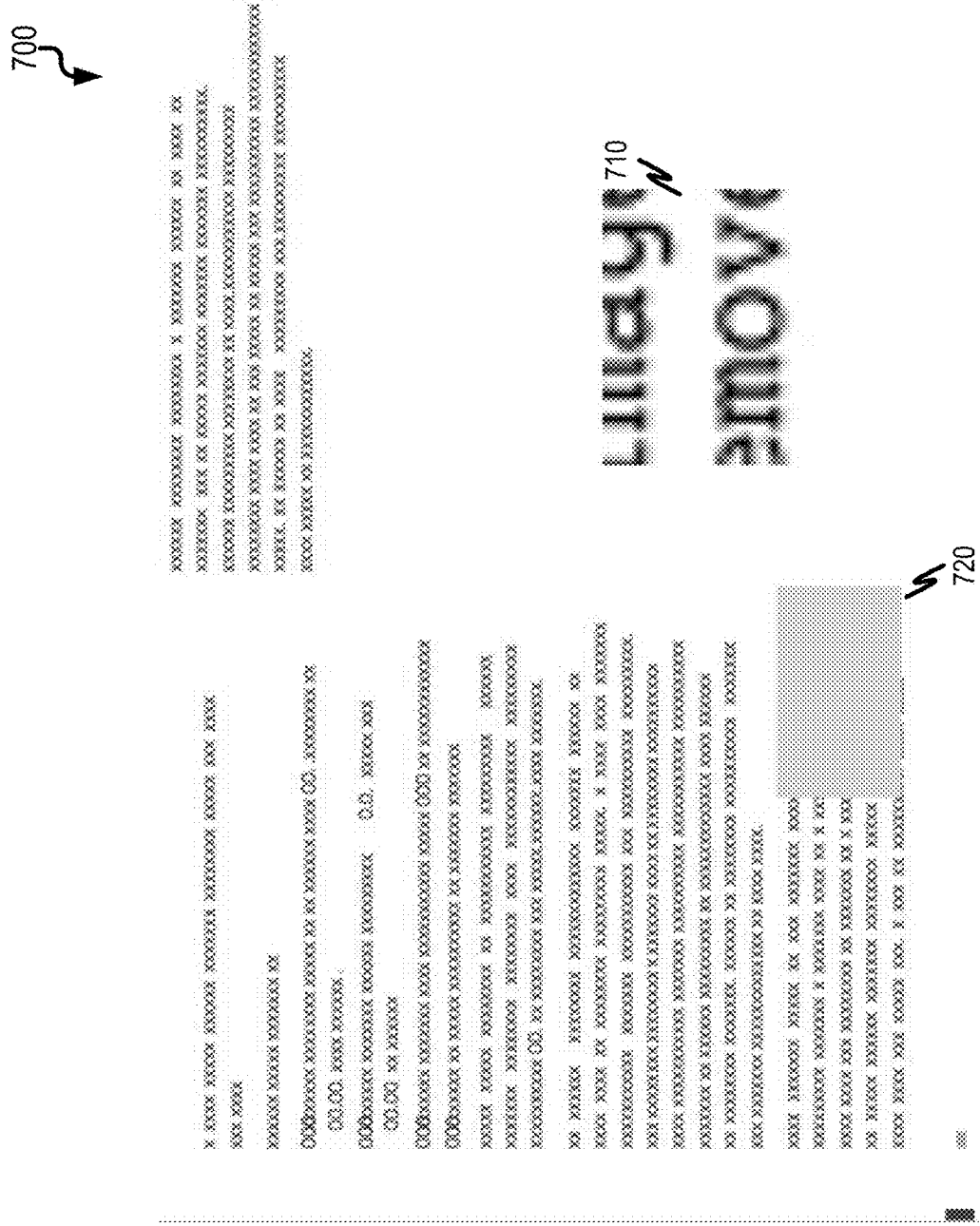
FIG. 7 is an example redacted document of the unredacted document in FIG. 6.

FIG. 6 is an example unredacted document 600 containing both text and an image 610. FIG. 7 is an example redacted document 700 of unredacted document 600. Images can be redacted through the substitution of a placeholder image. When substituting in a placeholder image, instructions and/or parameters around that image can be left intact. For example, the image can be within an element that is larger or smaller than the original image. Accordingly, the image may, or may not, be scaled to its container. The placeholder image can be scaled and/or clipped based on the parameters of the original image (i.e. if the original image was scaled or clipped—the placeholder image can be scaled or clipped). For example, placeholder image 710 corresponding to image 610 is both a scaled and clipped version of the image "Image Removed." If the original image was not scaling or clipping on the original image, the placeholder image can be displayed according to the default rules of the software that renders the image. The placeholder image can also be scaled or clipped based on a resolution mismatch with the original image. Streams of the image 610 can be padded such that the size of the object containing the image remains the same. Redacted component 720 is an example output of a graphics operator stream redaction. A mask has been relocated and resized in redacted document 700 using the techniques previously described.

Figure 8:
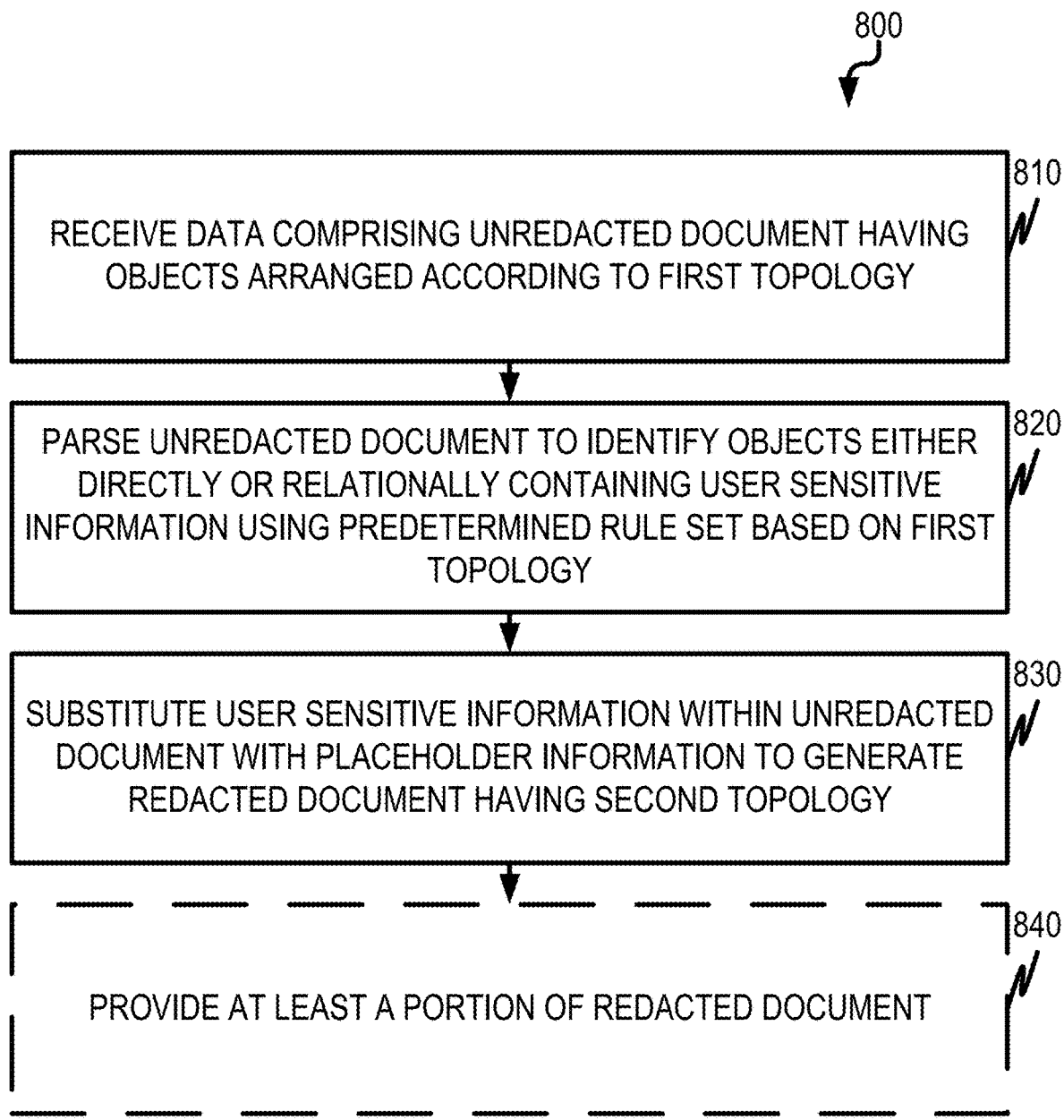
FIG. 8 is an example process flow diagram for redaction of AI training documents.

FIG. 8 is an example process flow diagram 800 for redaction of AI training documents. Data comprising an unredacted document is received, at 810, by one or more client devices 110. The unredacted document comprises a plurality of objects arranged according to a first topology. The unredacted document is parsed, at 820, to identify objects either directly or relationally containing user sensitive information using a predetermined rule set based on the first topology. The user sensitive information within the unredacted document is substituted, at 830, with placeholder information to generate a redacted document having a second topology. At least a portion of the redacted document can be provided, at 840.

Figure 9:
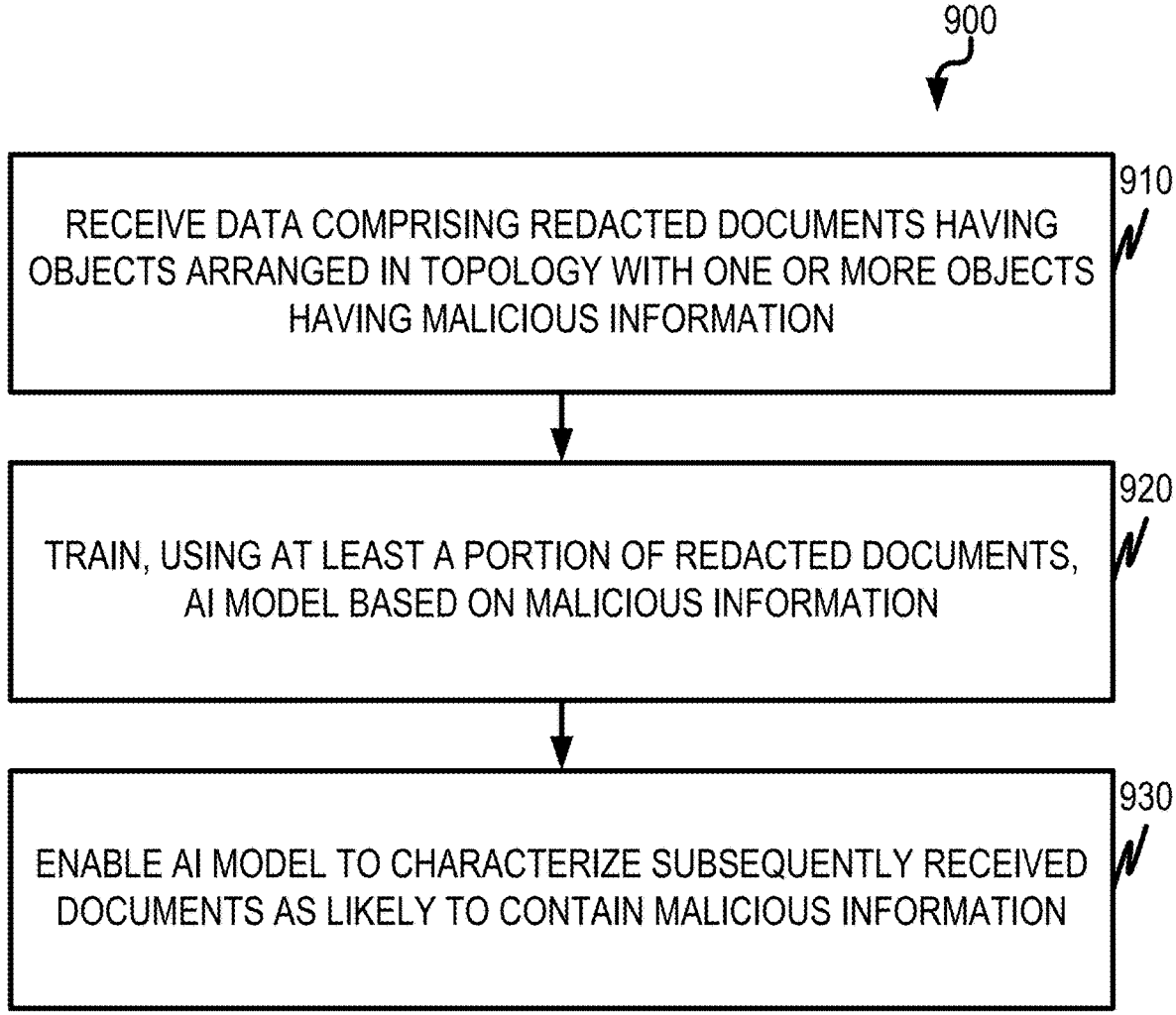
FIG. 9 is an example process flow diagram for training an AI model with redacted documents.

FIG. 9 is an example process flow diagram 900 for training an AI model with redacted documents. Data comprising each of a plurality of redacted documents can be received, at 910, by one or more servers 120. Each redacted document comprises a plurality of objects arranged in a topology. At least one of the plurality of redacted documents can include malicious information. For example, the malicious information can include scripts, malware, exploits, and/or bombs as previously described.

Using at least a portion of the plurality of redacted documents, an AI model can be trained, at 920, based on the malicious information. The AI model renders the malicious information into a plurality of data points. The AI model is enabled, at 930, to characterize subsequently received documents as likely to contain malicious information.

Figure 10:
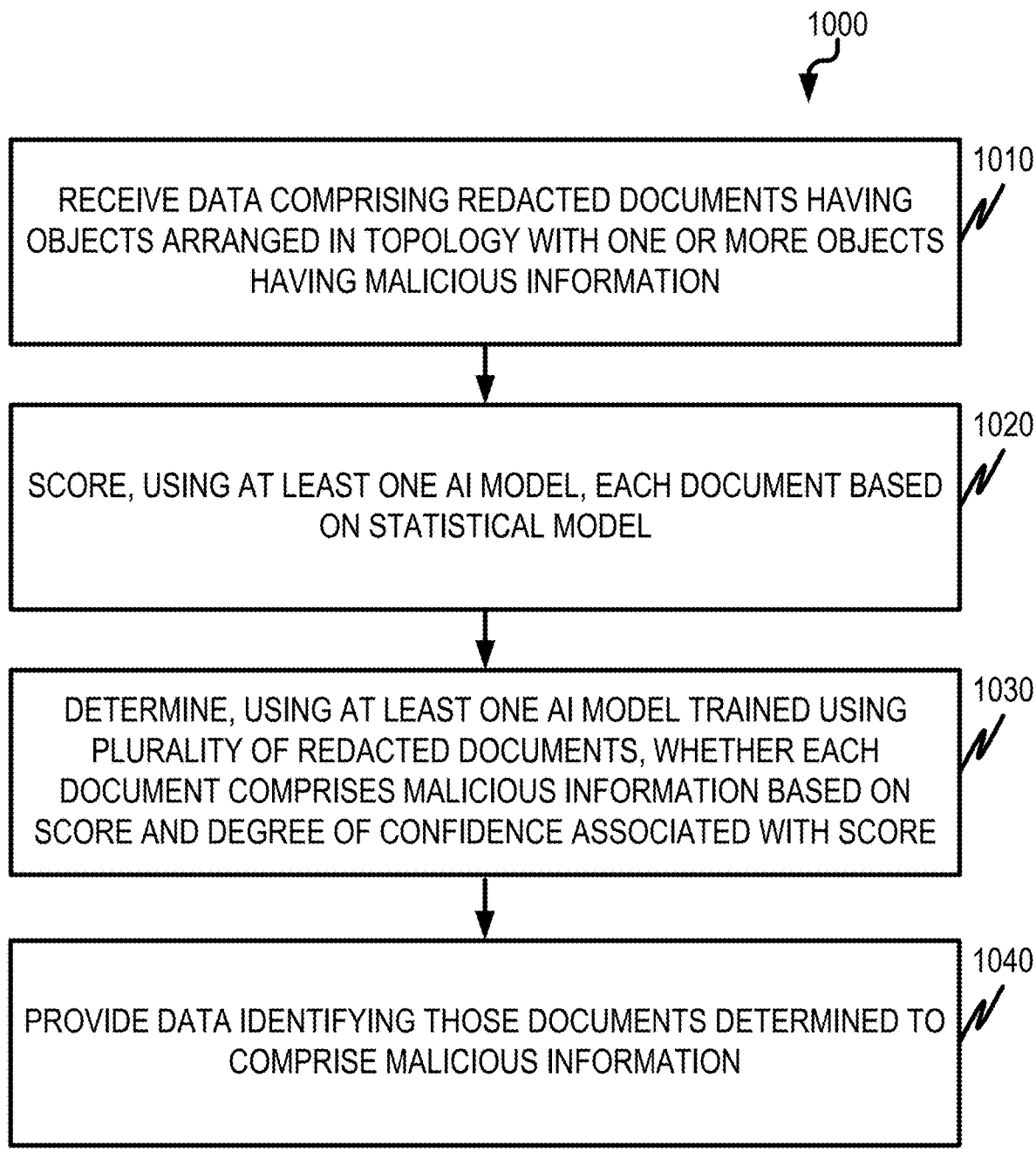
FIG. 10 is an example process flow diagram for determining whether a document contains malicious information.

FIG. 10 is an example process flow diagram 1000 for determining whether a document contains malicious information. Data comprising a plurality of redacted documents having a score and objects arranged in a topology with one or more objects having malicious information is received, at 1010. Each document is scored, at 1020, by at least one AI model based on a statistical model. Whether each document comprises malicious information is determined, at 1030, based on the score and a degree of confidence associated with the score.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 11:
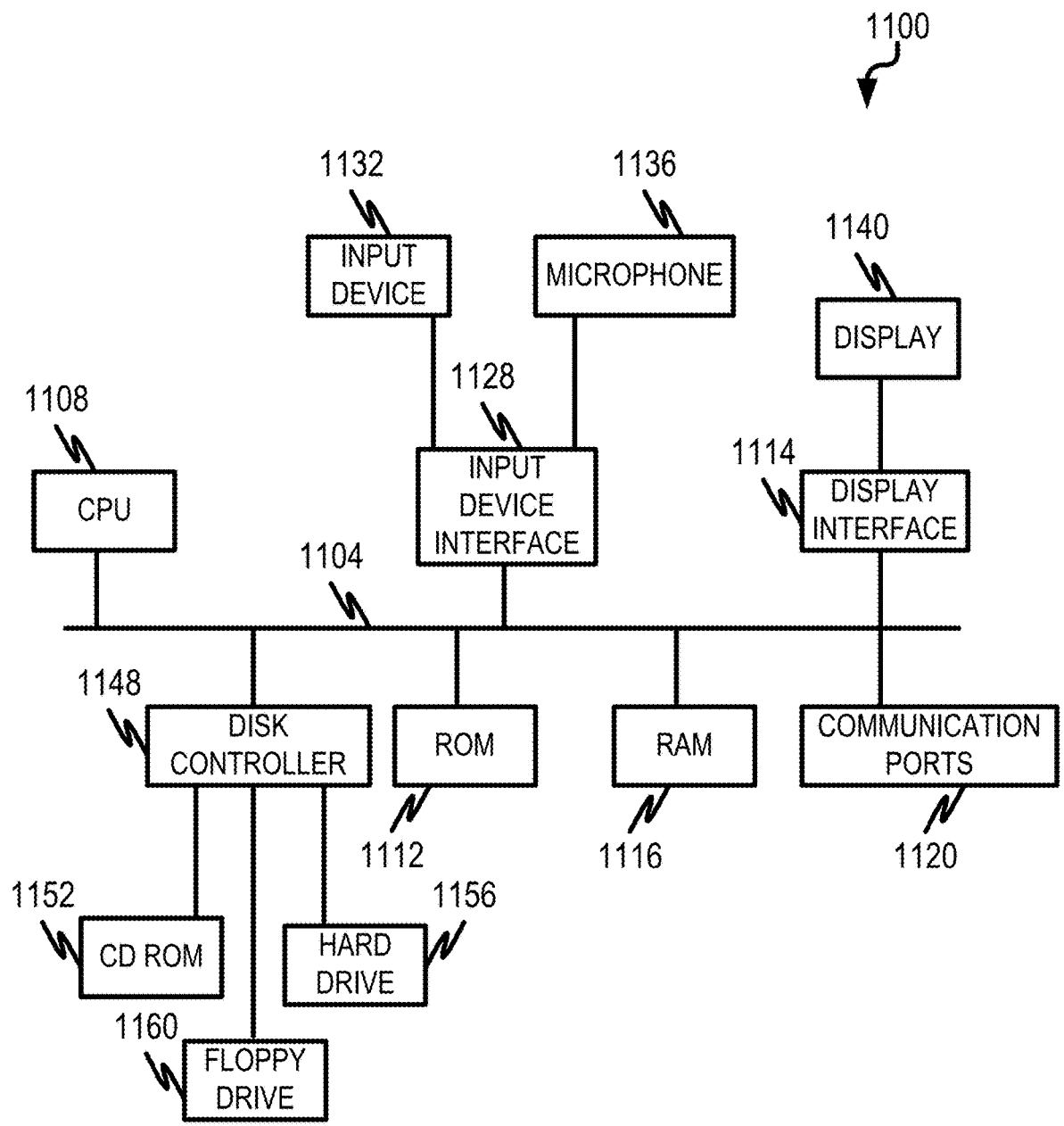
FIG. 11 is a diagram illustrating a sample computing device architecture for implementing various aspects described herein.

FIG. 11 is a diagram 1100 illustrating a sample computing device architecture for implementing various aspects described herein. A system bus 1104 can serve as the information highway interconnecting the other illustrated components of the hardware. A processing system 1108 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1112 and random access memory (RAM) 1116, can be in communication with the processing system 1108 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1148 can interface one or more optional disk drives to the system bus 1104. These disk drives can be external or internal floppy disk drives such as 1160, external or internal CD-ROM, CD-R, CD-RW or DVD, or solid state drives such as 1152, or external or internal hard drives 1056. As indicated previously, these various disk drives 1152, 1156, 1160 and disk controllers are optional devices. The system bus 1104 can also include at least one communication port 1120 to allow for communication with external devices either physically connected to the computing system or available externally through a wired or wireless network. In some cases, the communication port 1120 includes or otherwise comprises a network interface.

To provide for interaction with a user, the subject matter described herein can be implemented on a computing device having a display 1140 (e.g., a CRT (cathode ray tube) or LCD (liquid crystal display) monitor) for displaying information obtained from the system bus 1104 to the user and an input device 1132 such as keyboard and/or a pointing device (e.g., a mouse or a trackball) and/or a touchscreen by which the user can provide input to the computer. Other kinds of input devices 1132 can be used to provide for interaction with a user as well; for example, feedback provided to the user can be any form of sensory feedback (e.g., visual feedback, auditory feedback by way of a microphone 1136, or tactile feedback); and input from the user can be received in any form, including acoustic, speech, or tactile input. In the input device 1132 and the microphone 1136 can be coupled to and convey information via the system bus 1104 by way of an input device interface 1128. Other computing devices, such as dedicated servers, can omit one or more of the display 1140 and display interface 1114, the input device 1132, the microphone 1136, and input device interface 1128.

To provide for interaction with a user, the subject matter described herein can be implemented on a computing having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming one or more computing devices, the method comprising:

receiving, by at least one data processor, data comprising an unredacted document, the unredacted document comprising a plurality of objects arranged according to a first topology;

determining, by at least one data processor, a document type for the unredacted document from amongst a plurality of document types, each document type having a corresponding, different predetermine rule set;

parsing, by at least one data processor, the unredacted document to identify objects either directly or relationally containing user sensitive information using a predetermined rule set corresponding to the determined document type;

substituting, by at least one data processor, characters of the user sensitive information within the unredacted document with different characters of placeholder information to generate a redacted document having a second topology, wherein the placeholder information for an image of the plurality of objects comprises a placeholder image mirroring the dimensions of the image such that the placeholder image is equal in size to the image and wherein original parameters associated with the image are maintained within the placeholder image such that the placeholder image is scaled or clipped based on the original parameters;

adding bytes to an object containing the placeholder image so that a size of such redacted object is equal to a size of the corresponding object in the unredacted document; and providing, by at least one data processor, the redacted document having the second topology to an artificial intelligence (AI) model for training the AI model to detect malicious information within a plurality of subsequently received documents,
wherein the second topology is identical to the first topology.

2. The method according to claim 1, wherein a file size of the redacted document is similar to a file size of the unredacted document.

3. The method according to claim 1, further comprising providing, by the at least one data processor, at least a portion of the redacted document, wherein the providing comprises at least one of: displaying at least a portion of the redacted document, loading at least a portion of the redacted document into memory, storing at least a portion of the redacted document, or transmitting at least a portion of the redacted document to a remote computing system.

4. The method according to claim 1, further comprising initiating display of at least a portion of the redacted document in a graphical user interface of the computing device.

5. The method according to claim 1, further comprising generating random data using data external to the unredacted document, wherein the placeholder information comprises the generated random data.

6. The method according to claim 1, further comprising receiving user input information, via user data entry within a graphical user interface of the computing device, wherein the placeholder information comprises the user input information.

7. The method according to claim 1, further comprising generating data using data external to the unredacted document comprising at least one of encrypted data, encoded data, or compressed data, wherein the placeholder information comprises the generated data.

8. The method according to claim 1, wherein the user sensitive information comprises a uniform resource identifier (URI) and the placeholder information comprises a remote URI of a remote computing device.

9. The method according to claim 8, further comprising:
generating an identification tag for the redacted document, wherein the placeholder information comprises the identification tag;
identifying, by at least one data processor of the remote computing device, at least one of an Internet Protocol (IP) address, a timestamp, or a user account associated with an attempt to access the remote server URI originating from an unauthorized computing device; and
providing, by the at least one data processor of the remote server, a notification of the attempt by the unauthorized computing device to the computing device.

10. The method of claim 1, wherein at least one of the plurality of subsequently received documents comprise the malicious information and the AI model trained using the redacted document identifies the at least one of the plurality of subsequently received documents is malicious.

11. The method of claim 1, wherein the plurality of objects comprises text and the placeholder information is a byte-for-byte character swap with characters of the text.

12. A system comprising:
at least one data processor; and
memory storing instructions which, when executed by at least one data processor, result in operations comprising:
receiving, by at least one data processor of a computing device, data comprising an unredacted document, the unredacted document comprising a plurality of objects arranged according to a first topology;
determining, by at least one data processor, a document type for the unredacted document from amongst a plurality of document types, each document type having a corresponding, different predetermine rule set;
parsing, by at least one data processor, the unredacted document to identify objects either directly or relationally containing user sensitive information using a predetermined rule set corresponding to the determined document type;
substituting, by at least one data processor, characters of the user sensitive information within the unredacted document with different characters of placeholder information to generate a redacted document having a second topology, wherein the placeholder information for an image of the plurality of objects comprises a placeholder image mirroring the dimensions of the image such that the placeholder image is equal in size to the image and wherein original parameters associated with the image are maintained within the placeholder image such that the placeholder image is scaled or clipped based on the original parameters;
adding bytes to an object containing the placeholder image so that a size of such redacted object is equal to a size of the corresponding object in the unredacted document; and
providing, by at least one data processor, the redacted document having the second topology to an artificial intelligence (AI) model for training the AI model to detect malicious information within a plurality of subsequently received documents,
wherein the second topology is identical to the first topology.

13. The system according to claim 12, wherein a file size of the redacted document is similar to a file size of the unredacted document.

14. The system according to claim 12, wherein the operations further comprise providing, by the at least one data processor, at least a portion of the redacted document, wherein the providing comprises at least one of: displaying at least a portion of the redacted document, loading at least a portion of the redacted document into memory, storing at least a portion of the redacted document, or transmitting at least a portion of the redacted document to a remote computing system.

15. The system according to claim 12, wherein the operations further comprise initiating display of at least a portion of the redacted document in a graphical user interface of the computing device.

16. The system according to claim 12, wherein the operations further comprise generating random data using data external to the unredacted document, wherein the placeholder information comprises the generated random data.

17. The system according to claim 12, wherein the operations further comprise receiving user input information, via user data entry within a graphical user interface of the computing device, wherein the placeholder information comprises the user input information.

18. The system according to claim 12, wherein the operations further comprise generating data using data external to the unredacted document comprising at least one of encrypted data, encoded data, or compressed data, wherein the placeholder information comprises the generated data.

19. The system according to claim 12, wherein the user sensitive information comprises a uniform resource identifier (URI) and the placeholder information comprises a remote URI of a remote computing device.

20. The system according to claim 19, wherein the operations further comprise:
   generating an identification tag for the redacted document, wherein the placeholder information comprises the identification tag;
   identifying, by at least one data processor of the remote computing device, at least one of an Internet Protocol (IP) address, a timestamp, and a user account associated with an attempt to access the remote server URI originating from an unauthorized computing device; and
   providing, by the at least one data processor of the remote server, a notification of the attempt by the unauthorized computing device to the computing device.

21. A system comprising:
   means for receiving data comprising an unredacted document, the unredacted document comprising a plurality of objects arranged according to a first topology;
   means for determining, by at least one data processor, a document type for the unredacted document from amongst a plurality of document types, each document type having a corresponding, different predetermine rule set;
   means for parsing the unredacted document to identify objects either directly or relationally containing user sensitive information using a predetermined rule set based on the first topology;
   means for substituting characters of the user sensitive information within the unredacted document with different characters of placeholder information to generate a redacted document having a second topology, wherein the placeholder information for an image of the plurality of objects comprises a placeholder image mirroring the dimensions of the image such that the placeholder image is equal in size to the image and wherein original parameters associated with the image are maintained within the placeholder image such that the placeholder image is scaled or clipped based on the original parameters;
   means for adding bytes to an object containing the placeholder image so that a size of such redacted object is equal to a size of the corresponding object in the unredacted document; and
   means for providing the redacted document having the second topology to an artificial intelligence (AI) model for training the AI model to detect malicious information within a plurality of subsequently received documents,
   wherein the second topology is identical to the first topology;
   wherein the document type is selected from a group consisting of: a Portable Document Format (PDF), an Office Open Extendable Markup Language (OOXML), an Object-Linking and Embedding (OLE) document, and a Compound File Binary Format (CFB) file.

* * * * *